(12) United States Patent
Choi et al.

(10) Patent No.: US 9,349,163 B2
(45) Date of Patent: May 24, 2016

(54) APPARATUS AND METHOD FOR PROCESSING DEPTH IMAGE

(71) Applicant: SAMSUNG ELECTRONICS CO., LTD., Suwon-si (KR)

(72) Inventors: Ouk Choi, Yongin-si (KR); Byong Min Kang, Yongin-si (KR); Kee Chang Lee, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 84 days.

(21) Appl. No.: 13/922,627

(22) Filed: Jun. 20, 2013

(65) Prior Publication Data
US 2014/0185921 A1  Jul. 3, 2014

(30) Foreign Application Priority Data
Jan. 3, 2013  (KR) .................. 10-2013-0000516

(51) Int. Cl.
*G06K 9/00* (2006.01)
*G06T 5/00* (2006.01)
*G06T 5/20* (2006.01)

(52) U.S. Cl.
CPC . *G06T 5/002* (2013.01); *G06T 5/20* (2013.01); *G06T 2207/10028* (2013.01); *G06T 2207/20076* (2013.01)

(58) Field of Classification Search
CPC .................. G06T 2207/10028; G06T 5/002
USPC .................. 382/154, 106, 276, 285, 286
See application file for complete search history.

(56) References Cited

U.S. PATENT DOCUMENTS

| | | | |
|---|---|---|---|
| 8,270,752 B2 | 9/2012 | Yea et al. | |
| 2010/0302365 A1 | 12/2010 | Finocchio et al. | |
| 2011/0044506 A1* | 2/2011 | Chen | 382/103 |
| 2011/0249866 A1 | 10/2011 | Piestun et al. | |
| 2012/0173184 A1* | 7/2012 | Ovsiannikov | G01S 17/08 702/97 |
| 2013/0016900 A1* | 1/2013 | Kim et al. | 382/162 |

FOREIGN PATENT DOCUMENTS

KR  10-2011-0020718  3/2011

* cited by examiner

*Primary Examiner* — Manuchehr Rahmjoo
*Assistant Examiner* — Mike Rahmjoo
(74) *Attorney, Agent, or Firm* — Harness, Dickey & Pierce, P.L.C.

(57) ABSTRACT

A method and apparatus for processing a depth image that removes noise of a depth image may include a noise estimating unit to estimate noise of a depth image using an amplitude image, a super-pixel generating unit to generate a planar super-pixel based on depth information of the depth image and the noise estimated, and a noise removing unit to remove noise of the depth image using depth information of the depth image and depth information of the super-pixel.

17 Claims, 7 Drawing Sheets

APPARATUS AND METHOD FOR PROCESSING DEPTH IMAGE

CROSS-REFERENCE TO RELATED APPLICATIONS

This application claims the priority benefit of Korean Patent Application No. 10-2013-0000516, filed on Jan. 3, 2013, in the Korean Intellectual Property Office, the disclosure of which is incorporated herein by reference.

BACKGROUND

1. Field

The following description relates to an apparatus and method for processing a depth image that reduces noise of a depth image.

2. Description of the Related Art

A time-of-flight (TOF) camera may irradiate light in a frequency range of infrared rays to an object, and calculate a distance to the object using the irradiated light reflected off the object. The TOF camera may generate a depth image of which a distance to the object is imaged, using a period of time from when light is irradiated to when the reflected irradiated light returns. More particularly, the TOF camera may irradiate light modulated to a predetermined frequency towards an object, and calculate a distance value at a pixel through a phase difference between the irradiated light and light reflected off the object. The TOF camera may measure a depth value in a total number of pixels and generate a depth image in real time because light is irradiated directly by the TOF camera.

SUMMARY

The foregoing and/or other aspects are achieved by providing an apparatus for processing a depth image, the apparatus including a noise estimating unit to estimate noise of a depth image using an amplitude image, a super-pixel generating unit to generate a super-pixel, based on amplitude information of a pixel configuring the amplitude image, depth information of the depth image, and the noise estimated, and a noise removing unit to remove the noise of the depth image using the depth information of the depth image and depth information of the super-pixel.

The super-pixel generating unit may generate a super-pixel, based on a difference in amplitudes between neighboring pixels, among pixels configuring the amplitude image.

The super-pixel generating unit may calculate a depth offset for a spatial point of a pixel configuring the amplitude image using the depth information of the depth image, and generate a super-pixel based on the depth offset and the noise estimated.

The foregoing and/or other aspects are achieved by providing a method for processing a depth image, the method including estimating noise of a depth image using an amplitude image, generating a super-pixel, based on amplitude information of a pixel configuring the amplitude image, depth information of the depth image, and the noise estimated, and removing the noise of the depth image using the depth information of the depth image and depth information of the super-pixel.

The foregoing and/or other aspects are achieved by providing a method for processing a depth image, the method including grouping pixels into a super-pixel using an amplitude image and a depth image, and removing noise of the depth image using depth information of the super-pixel.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
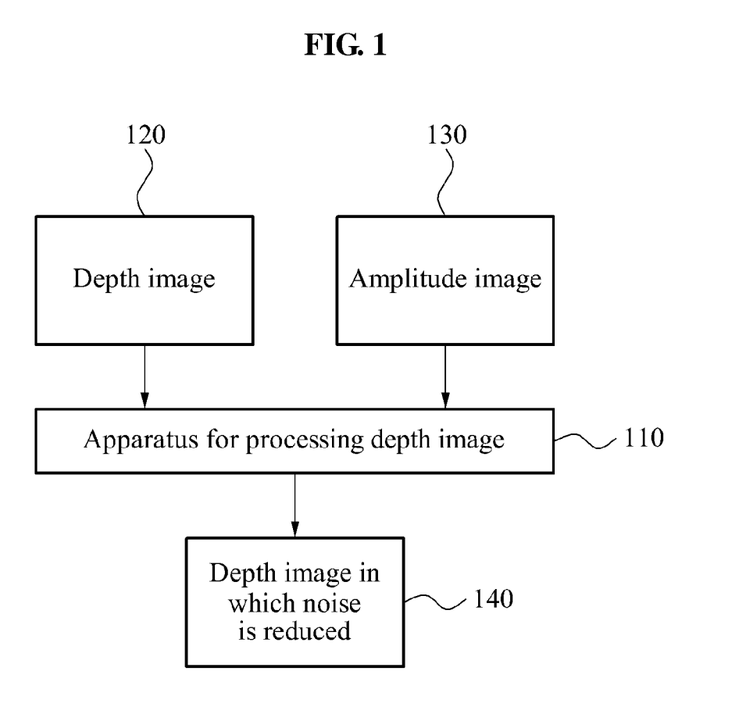
FIG. 1 illustrates an operation of an apparatus for processing a depth image according to example embodiments.

FIG. 1 illustrates an operation of an apparatus 110 for processing a depth image according to example embodiments.

The apparatus 110 for processing the depth image may output a depth image in which noise is removed, or a depth image 140 in which noise is reduced, through inputting a depth image 120 and an amplitude image 130. More particularly, the apparatus 110 for processing the depth image may remove noise from the depth image 120, using amplitude information of a pixel configuring the amplitude image 130 and depth information of the depth image 120. The amplitude information of the pixel may represent a strength, or intensity, of light represented by the pixel. The apparatus 110 for processing the depth image may be provided internally or externally of a depth camera.

The depth image 120 and the amplitude image 130 may be generated by the depth camera. The depth image 120 may indicate a distance between an object and the depth camera, and the amplitude image 130 may indicate a strength, or intensity, of light reflected or refracted from the object.

The noise of the depth image 120 may be influenced by such factors as a distance to the object, or a material property of the object, for example. A material property may refer to such properties as a semi-conductor, for example. In order to remove the noise of the depth image 120 properly, the apparatus 110 for processing the depth image may remove noise of the depth image 120, based on a fact that a scene displayed by the depth image 120 and the amplitude image 130 are configured by multiple planes. More particularly, the apparatus 110 for processing the depth image may generate a planar super-pixel, or a "super-pixel", by grouping pixels, and remove the noise of the depth image 120, based on the generated super-pixel.

Figure 2:
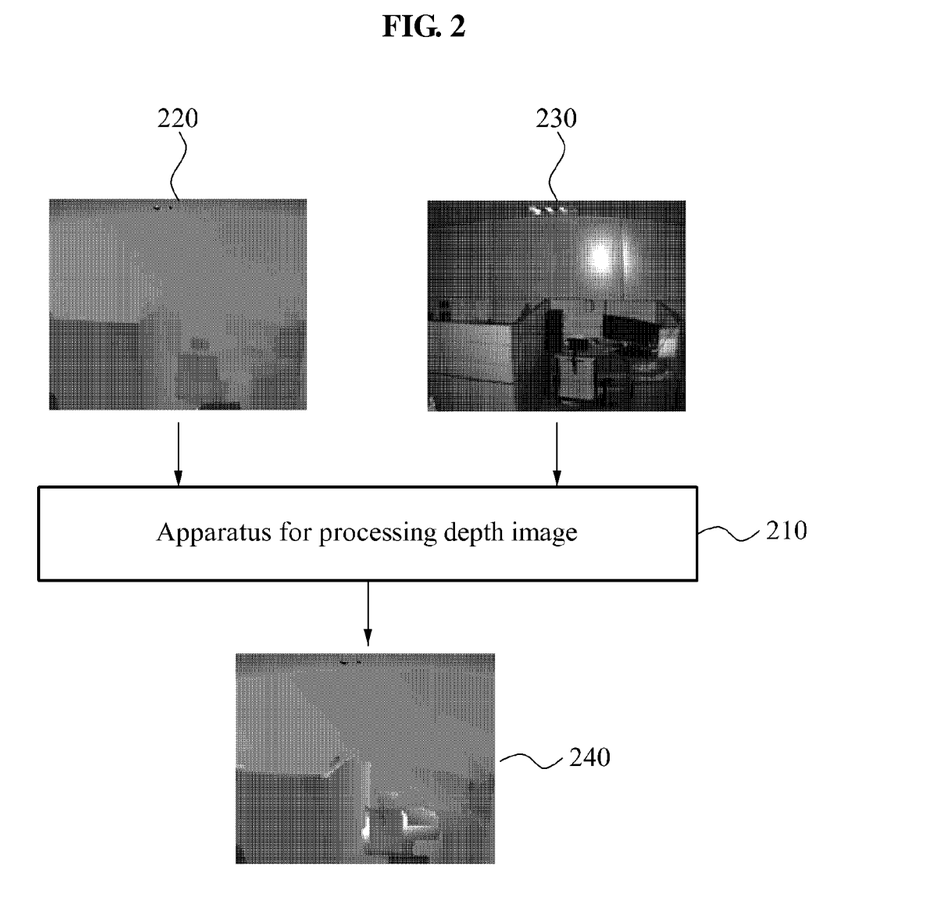
FIG. 2 illustrates an example of an input image and an output image of an apparatus for processing a depth image according to example embodiments.

FIG. 2 illustrates an example of an input image and an output image of an apparatus 210 for processing a depth image, according to example embodiments.

Referring to FIG. 2, an example of a depth image 220 and an amplitude image 230 that are images input to the apparatus 210 for processing the depth image are illustrated. The depth image 220 may represent depth perception by representing a distance to an object. For example, an area represented in a dark color in the depth image 220 may indicate that a distance to the object is farther than a distance to an area represented in a bright color. The amplitude image 230 with respect to an identical scene to that of depth image 220 may indicate a strength, or intensity, of reflected light, and enable the object to be identified.

The apparatus 210 for processing the depth image may use a super-pixel generated by grouping pixels in order to reduce noise of the depth image 220. The apparatus 210 for processing the depth image may newly determine a depth value represented by a pixel of the depth image 220, based on depth information of the super-pixel. Accordingly, the apparatus 210 for processing the depth image may output the depth image 240 in which noise is reduced as shown in FIG. 2.

Figure 3:
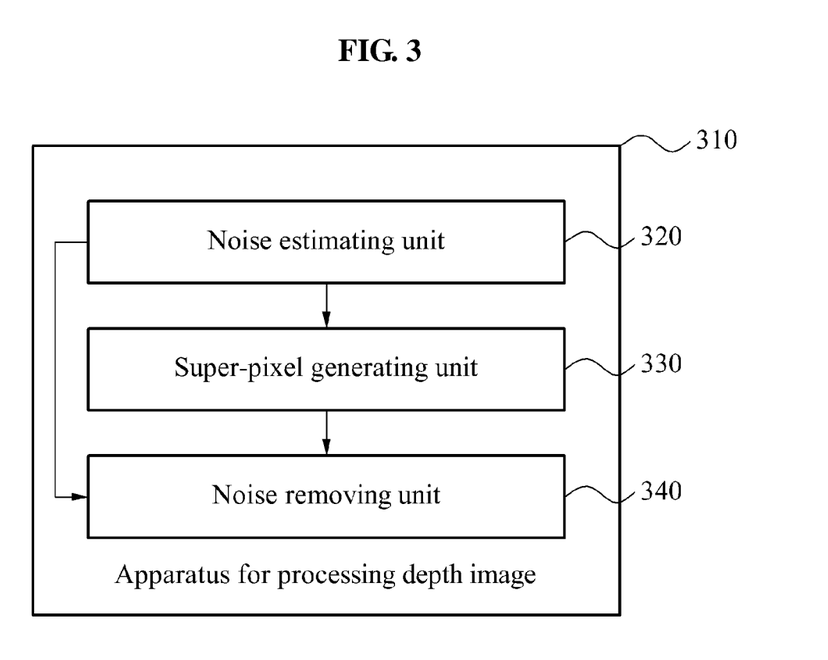
FIG. 3 illustrates a detailed configuration of an apparatus for processing an image according to example embodiments.

FIG. 3 illustrates a detailed configuration of an apparatus 310 for processing a depth image according to example embodiments.

Referring to FIG. 3, the apparatus 310 for processing the depth image may include a noise estimating unit 320, a super-pixel generating unit 330, and a noise removing unit 340.

The noise estimating unit 320 may estimate noise of a depth image, using an amplitude image. For example, the noise estimating unit 320 may estimate the noise of the depth image by applying, to a Gaussian distribution model, amplitude information of a pixel configuring an amplitude image. The noise estimating unit 320 may model the noise of the depth image in a form of the Gaussian distribution model, and estimate a magnitude of the noise of the depth image by calculating a standard deviation of the Gaussian distribution model obtained through modeling the noise of the depth image. A standard deviation σ of the Gaussian distribution model obtained through modeling the noise of the depth image may have a relationship as defined in Equation 1.

$$\sigma \propto \frac{\sqrt{B}}{fA\sqrt{T}} \quad \text{[Equation 1]}$$

In Equation 1, f denotes a frequency of light irradiated from a depth camera, and B denotes a direct current (DC) component of a strength of light reflected off an object. A denotes an amplitude component of the strength of light reflected off the object, and T denotes an integration time of an electric charge in a depth sensor.

As another example, the noise estimating unit 320 may estimate noise of a depth image by applying, to a Poisson distribution model, amplitude information of a pixel configuring an amplitude image. The noise of the depth image may be determined based on a number of electrons in a pixel generated by reflected light. The noise estimating unit 320 may model the number of electrons generated in the pixel by the Poisson distribution model, and a magnitude of the noise of the depth image may be estimated based on the modeled Poisson distribution. ΔR, being a magnitude of the noise of the depth image approximated through the Poisson distribution model, may have a relationship represented by Equation 2.

$$\Delta R \propto \frac{k}{\sqrt{N_{electron}}} \quad \text{[Equation 2]}$$

In Equation 2, k denotes a predetermined constant, and $N_{electron}$ denotes a number of electrons generated in a pixel. Equation 2 indicates that the size of the noise of the depth image may be related to the number of electrons in the pixel generated by reflected light. The number of electrons generated in the pixel may correspond to an amplitude represented by the amplitude image. For example, the greater the number of electrons generated in the pixel, the greater the amplitude of the pixel in the amplitude image.

The noise estimating unit 320 may estimate the size of the noise of the depth image, based on the aforementioned Gaussian distribution model or the Poisson distribution model, and generate a noise image by estimating noise with respect to a total number of pixels.

The super-pixel generating unit 330 may generate a super-pixel, being a planar super-pixel group, using the depth image and the amplitude image. In particular, the super-pixel generating unit 330 may generate a planar super-pixel, based on the amplitude information of the pixel configuring the amplitude image, the depth information of the depth image, and the noise of the depth image estimated by the noise estimating unit 320. The planar super-pixel may be a group of pixels representing three-dimensional (3D) spatial points on the same plane in a space.

According to example embodiments, the super-pixel generating unit 330 may generate a planar super-pixel based on the following process.

The super-pixel generating unit 330 may initialize a plurality of pixels from among a total number of pixels to a single planar super-pixel. The super-pixel generating unit 330 may initialize a normal direction of a plane corresponding to the plurality of pixels to a ray direction represented by a spatial point. The plane corresponding to the plurality of pixels may be a plane that passes the spatial point represented by the plurality of pixels.

The super-pixel generating unit 330 may connect neighboring pixels by an "edge" to set a pixel pair. The super-pixel generating unit 330 may calculate a difference in amplitudes between the neighboring pixels from among pixels configuring an amplitude image.

The super-pixel generating unit 330 may determine whether to set the neighboring pixels to be the pixel pair, based on a size of the difference in amplitudes between the neighboring pixels. For example, the super-pixel generating unit 330 may not set the neighboring pixels to be the pixel pair when the difference in amplitudes between the neighboring pixels is greater than N multiples of an average value. In this instance, the average value may be an average of sums of the difference in amplitudes between the neighboring pixels calculated with respect to the total number of pixels, and N may be a predetermined number.

The super-pixel generating unit 330 may determine whether to group the neighboring pixels in sequential manner, starting from a pixel of which the difference in amplitudes is smallest, and the difference in amplitudes of the neighboring pixels increases. For example, the super-pixel generating unit 330 may align pixel pairs, based on the size of the difference in amplitudes, and determine whether to group the pixels in a sequential manner starting from a pixel pair of which the difference in amplitudes between the pixels is smallest, and the difference in amplitudes increases.

The super-pixel generating unit 330 may determine whether to group other neighboring pixels when the neighboring pixels connected by the edge are included in a super-pixel on the same plane.

The super-pixel generating unit 330 may group neighboring pixels when the neighboring pixels connected by the edge are included in a super-pixel on a different plane, and a total number of pixels configuring the super-pixel on the different plane is two.

The super-pixel generating unit 330 may apply a new plane with respect to spatial points for a total number of pixels included in the super-pixel on the different plane when the neighboring pixels are included in the super-pixel on the different plane, and the total number of pixels configuring the super-pixel on the different plane is greater than three. The plane to be applied to the spatial points may be determined based on a location of the spatial points of the total number of pixels configuring the super-pixel on the different plane.

The super-pixel generating unit 330 may determine whether to group neighboring pixels based on a depth offset for the spatial points of the total number of pixels configuring the super-pixel on the different plane. The depth offset for the spatial points may indicate a difference between a depth value on the plane applied to the spatial points and a measured depth value represented by a depth image.

The super-pixel generating unit 330 may calculate a depth offset for the spatial points of the pixel configuring the amplitude image using the depth information of the depth image, and generate a super-pixel based on the depth offset calculated and noise estimated by the noise estimating unit 320.

For example, the super-pixel generating unit 330 may generate a super-pixel on a new plane by grouping a total number of pixels configuring a super-pixel on a different plane when a depth offset for a total of spatial points configuring the super-pixel on the different plane is less than a predetermined value, such as a K multiple, for example, of a magnitude of noise a estimated by the noise estimating unit 320, K being a predetermined number. Conversely, the super-pixel generating unit 330 may not perform grouping of a pixel when the depth offset for the spatial points is greater than the predetermined value.

The noise removing unit 340 may remove noise of a depth image using depth information of the depth image and depth information of the super-pixel. The depth information of the depth image may indicate a distance value measured to an object. The super-pixel may have information about an index of pixels included in the super-pixel, a number of pixels included in the super-pixel, and a parameter on a plane represented by the super-pixel, such as a, b, c, and d, for example, being a coefficient of a plane equation "a*X+b*Y+c*Z+d=0". The depth information of the super-pixel may represent a depth value on a plane which is applied to a spatial point, and the depth value on the plane may be calculated based on the index of the pixels included in the super-pixel and the parameter on the plane represented by the super-pixel.

The noise removing unit 340 may determine a depth value of a pixel configuring a depth image, based on an energy function to which the depth information of the pixel configuring the depth image and the depth information of the super-pixel are applied. The energy function may be determined based on a likelihood function associated with the depth information of the pixel configuring the depth image and a likelihood function associated with the depth information of the super-pixel.

For example, a likelihood function associated with depth information of a super-pixel $s_i$ representing a plane "i" may be defined by Equation 3. Equation 3 represents a likelihood of a depth value $r_a$ of a single pixel "a" of a depth image.

$$p(r_a \mid \Theta) = \sum_i \frac{n_i}{N} \frac{1}{\sqrt{2\pi\sigma_i^2}} \exp\left(-\frac{(r_a - r_a^*)^2}{2\sigma_i^2}\right) \quad \text{[Equation 3]}$$

In Equation 3, N denotes a total number of pixels included in the depth image, and $n_i$ denotes a number of pixels included in the super-pixel $s_i$. $\sigma_i$ denotes an average value of a depth offset for spatial points of pixels included in the super-pixel $s_i$. $r_a^*$, present on a plane represented by the super-pixel $s_i$, denotes a depth value for the spatial points having a direction identical to a ray direction of the pixel "a".

When a plane i* including the pixel "a" is identified precisely, Equation 3 may be represented by Equation 4.

$$p(r_a \mid \Theta) = \frac{1}{\sqrt{2\pi\sigma_{i^*}^2}} \exp\left(-\frac{(r_a - r_a^*)^2}{2\sigma_{i^*}^2}\right) \quad \text{[Equation 4]}$$

The likelihood of the depth value $r_a$ of the single pixel "a" of a depth image, in particular, a likelihood function associated with the depth information of the pixel configuring the depth image, may be calculated by Equation 5.

$$p(\hat{r}_a \mid r_a, \sigma_a) = \frac{1}{\sqrt{2\pi\sigma_a^2}} \exp\left(-\frac{(r_a - \hat{r}_a)^2}{2\sigma_a^2}\right) \quad \text{[Equation 5]}$$

In Equation 5, $\sigma_a$, a standard deviation of noise of the depth value $r_a$, denotes a size of noise estimated by the noise estimating unit 320. $\hat{r}_a$ denotes an estimated depth value of the pixel "a".

An energy function, more particularly, a sum of the likelihood function, as shown in Equation 6, may be defined based on Equation 4 and Equation 5.

$$D(r_a) = D_{measurement}(r_a) + D_{planar}(r_a) \quad \text{[Equation 6]}$$
$$= \frac{(r_a - \hat{r}_a)}{2\sigma_a^2} + \frac{(r_a - r_a^*)^2}{2\sigma_{i^*}^2}$$

The noise removing unit 340 may remove the noise of the depth image by estimating the depth value $r_a$ that minimizes Equation 6 for a plurality of pixels.

The noise removing unit 340 may determine the depth value of the pixel configuring the depth image, based on the energy function with respect to a total number of pixels. The energy function may include an energy function to which the depth information of the pixel configuring the depth image and the depth information of the super-pixel are applied and an energy function defined between neighboring pixels.

For example, a global energy function defined by a total number of images or the total number of pixels may be expressed by Equation 7.

$$E(r) = \sum_a D(r_a) + \sum_a \sum_{b \in N_a} V(r_a, r_b) \quad \text{[Equation 7]}$$

In Equation 7, $r_b$ denotes a depth value of a pixel "b" neighboring the pixel "a", and $N_a$ denotes a collection of pixels neighboring the pixel "a". The noise removing unit 340 may remove noise of the depth image by estimating the depth value $r_a$ that minimizes a result of the energy function as shown in Equation 7. The noise removing unit 340 may calculate distance values that minimize the energy function of Equation 7, based on a Gauss-Siedel method or a Jacobbi method, being a method for numerical analyzing.

$V(r_a, r_b)$ denotes an energy function defined between the pixel "a" and the pixel "b" neighboring one another. $V(r_a, r_b)$ may have a greater value as a difference in amplitudes between the pixel "a" and the pixel "b" decreases, a difference in the estimated distance values between the pixel "a" and the pixel "b" decreases, and a difference between the depth value $r_a$ and the depth value $r_b$ increases. For example, $V(r_a, r_b)$ may be represented by Equation 8.

$$V(r_a, r_b) = \lambda \exp\left(-\frac{(A_a - A_b)^2}{2\sigma_A^2}\right) \exp\left(-\frac{(\hat{r}_a - \hat{r}_b)^2}{2\sigma_a^2}\right)(r_a - r_b)^2 \quad \text{[Equation 8]}$$

Figure 4:
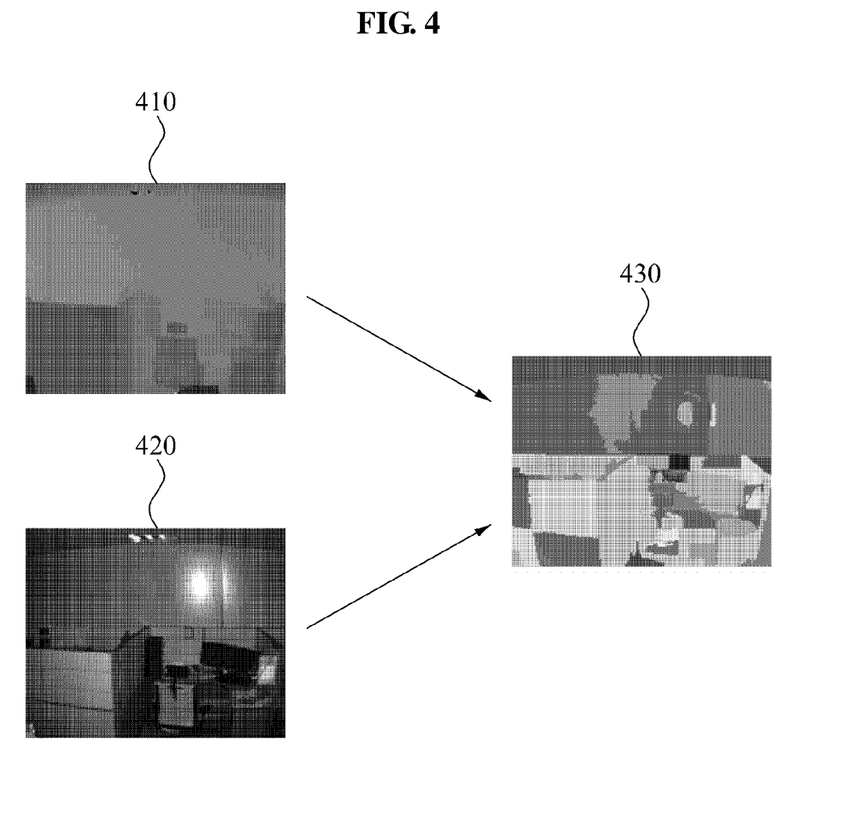
FIG. 4 illustrates an example of generating planar super-pixels according to example embodiments.

FIG. 4 illustrates an example of generating planar super-pixels according to example embodiments.

An apparatus for processing a depth image may group pixels in a unit of plane using a depth image 410 and an amplitude image 420. More particularly, the apparatus for processing the depth image may group the pixels based on amplitude information of a pixel configuring the amplitude image 420, depth information of the depth image 410, and noise of the depth image estimated based on the amplitude image 420. The grouped pixels may configure a planar super-pixel or a patch area. The planar super-pixel or the patch area may represent a plane on a space including a spatial point of pixels. Super-pixels on different planes generated using the depth image 410 and the amplitude image 420 are illustrated in an image 430.

Figure 5:
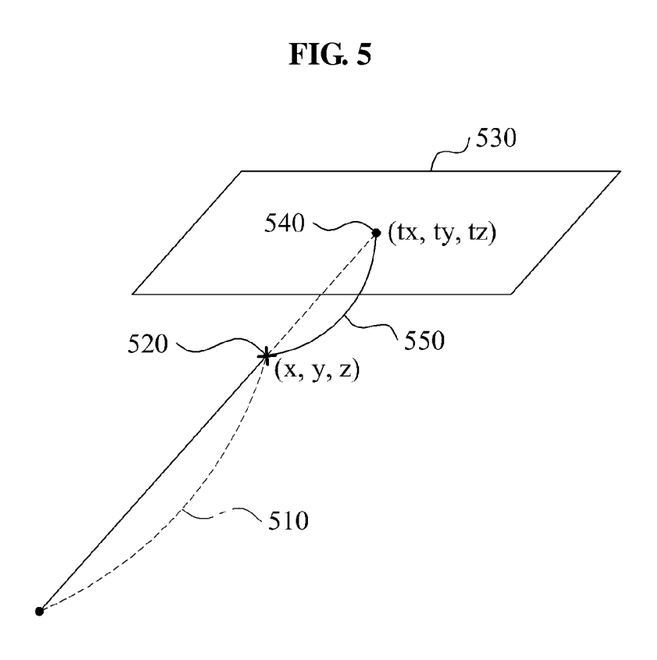
FIG. 5 illustrates an example of calculating a depth offset for a spatial point according to example embodiments.

FIG. 5 illustrates an example of calculating a depth offset for a spatial point according to example embodiments.

Referring to FIG. 5, the depth offset for the spatial point may represent a difference between a depth value on a plane applied to the spatial point and an estimated depth value represented by a depth image. A location 520 in a space may represent a location of a spatial point of a pixel "a" having a depth value 510 estimated. A location 540 in a space present on a plane 530 may represent a location on the plane 530 applied to the spatial point of the pixel "a".

When the location 520 in the space is represented by (x, y, z), the location 540 on the space present on the plane 530 may be expressed by coordinates of (t*x, t*y, t*z). In this instance, a constant "t" may be determined based on a plane equation of the plane 530 and the location 520 in the space. A depth offset "e" 550 for the spatial point may represent a distance between the location 520 in the space and the location 540 in the space disposed on the plane 530, which is calculated by Equation 9.

$$e = |t-1| \times \sqrt{x^2 + y^2 + z^2}$$

Figure 6:
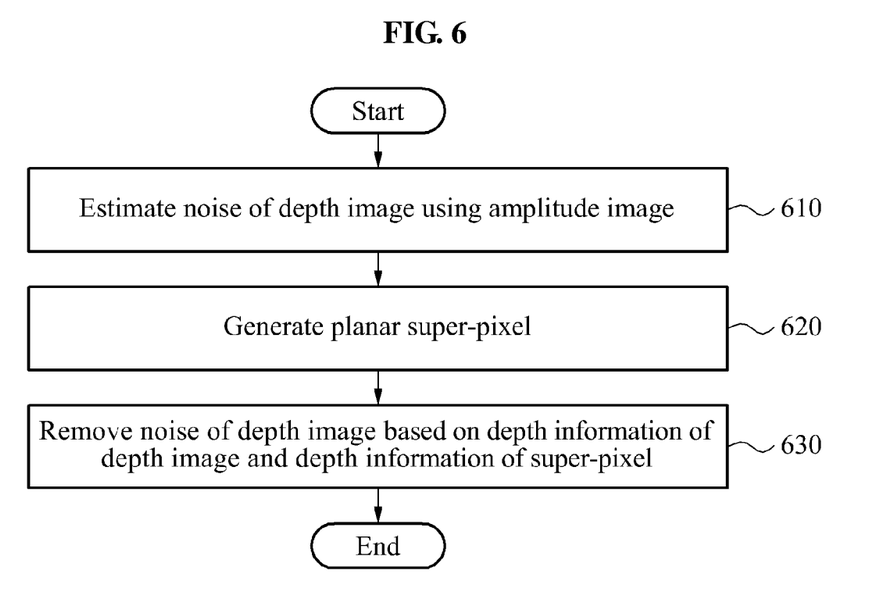
FIG. 6 illustrates an operational method for processing a depth image according to example embodiments.

FIG. 6 illustrates an operation of a method for processing a depth image according to example embodiments.

In operation 610, an apparatus for processing a depth image may estimate noise of a depth image using an amplitude image. For example, a noise estimating unit may estimate noise of the depth image by applying amplitude information of a pixel configuring the amplitude image to a Gaussian distribution model or a Poisson distribution model. The apparatus for processing the depth image may generate a noise image by estimating noise for a plurality of pixels.

In operation 620, the apparatus for processing the depth image may generate a planar super-pixel using the depth image and the amplitude image. More particularly, the apparatus for processing the depth image may generate a planar super-pixel, based on the amplitude information of the pixel configuring the amplitude image, the depth information of the depth image, and the noise of the depth image estimated in operation 610.

The apparatus for processing the depth image may set a pixel pair by connecting neighboring pixels, and generate a super-pixel, based on a difference in amplitudes between pixels configuring the pixel pair. The apparatus for processing the depth image may align pixel pairs based on a size of the difference in amplitudes, and determine whether to group pixels increases in a sequential manner starting from a pixel pair of which the difference in amplitudes is smallest, and in which the difference in amplitudes increases.

The apparatus for processing the depth image may determine whether to group neighboring pixels based on a total number of pixels configuring a super-pixel on a different plane when pixels configuring the pixel pair are included in the super-pixel on the different plane. The apparatus for processing the depth image may group the neighboring pixels when the total number of pixels configuring the super-pixel on the different plane is two, and when the total number of pixels is greater than three, whether to group the neighboring pixels may be determined based on a depth offset for spatial points.

For example, the apparatus for processing the depth image may generate a super-pixel on a new plane by grouping the total number of pixels configuring the super-pixel on a different plane when a depth offset for a total spatial points configuring the super-pixel on the different plane is less than or equal to a predetermined value. Conversely, the apparatus for processing the depth image may not perform grouping of pixels when the depth offset for the total spatial points is greater than the predetermined value.

In operation 630, the apparatus for processing the depth image may remove noise of a depth image using depth information of the depth image and depth information of the super-pixel. The depth information of the depth image may represent a distance value estimated to an object. The depth information of the super-pixel may represent a depth value on a plane which is applied to a spatial point, and the depth value on the plane may be calculated based on an index of pixels included in the super-pixel and a parameter on the plane represented by the super-pixel.

The apparatus for processing the depth image may determine a depth value of a pixel configuring a depth image, based on an energy function to which the depth information of the pixel configuring the depth image and the depth information of the super-pixel are applied. The energy function may be determined based on a likelihood function associated with the depth information of the pixel configuring the depth image and a likelihood function associated with the depth information of the super-pixel. The apparatus for processing the depth image may remove noise of the depth image by estimating a depth value that minimizes a result of the energy function.

The apparatus for processing the depth image may determine the depth value of the pixel configuring the depth image, based on a global energy function with respect to a total number of pixels. The global energy function may include an energy function to which the depth information of the pixel configuring the depth image and the depth information of the super-pixel are applied and an energy function defined between neighboring pixels. The apparatus for processing the depth image may calculate distance values that minimize the global energy function, based on the Gauss-Siedel method or the Jacobbi method.

Figure 7:
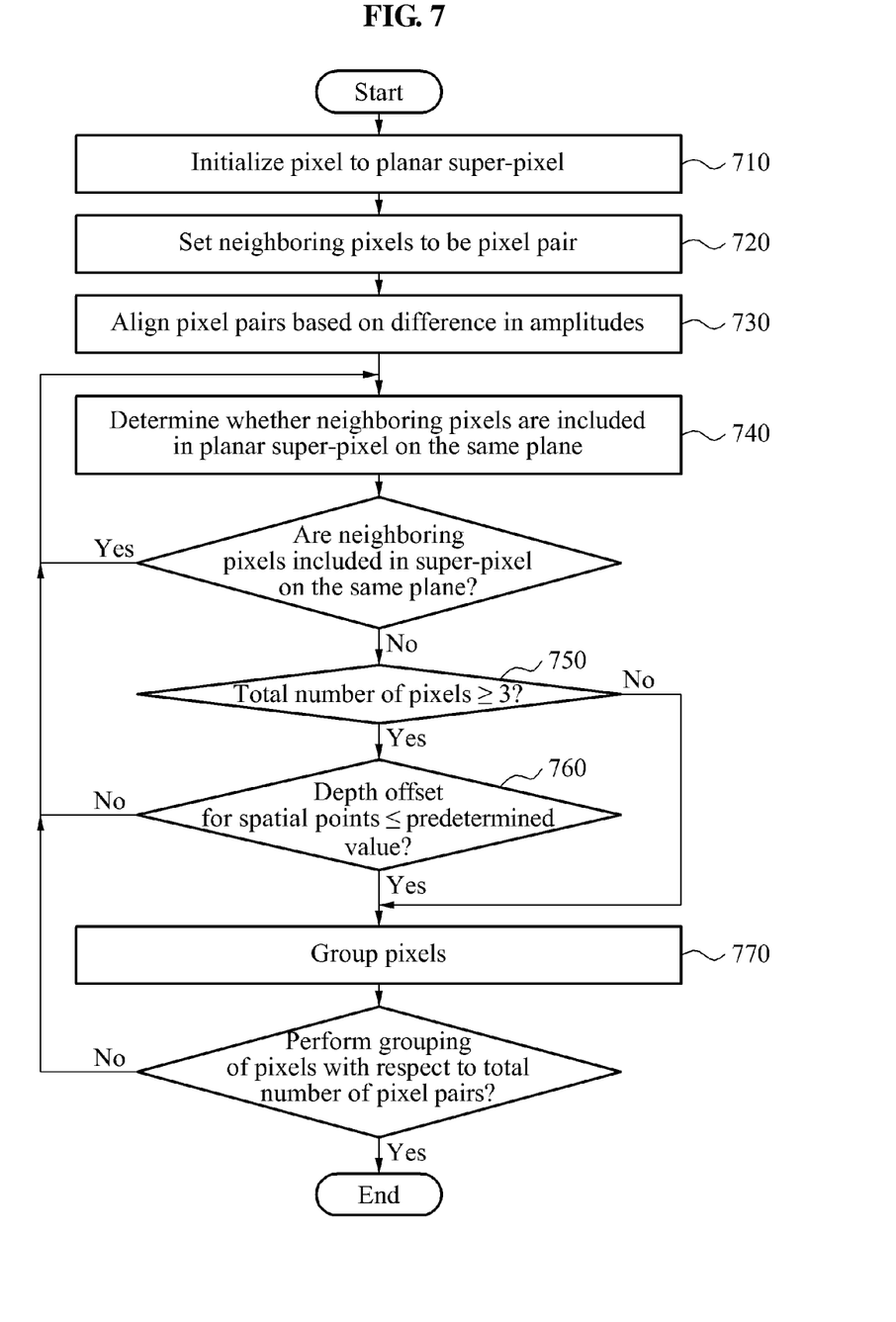
FIG. 7 illustrates an operational method for generating a super-pixel according to example embodiments.

FIG. 7 illustrates an operation of generating a super-pixel according to example embodiments.

In operation 710, an apparatus for processing a depth image may initialize a plurality of pixels from among a total number of pixels to be a single planar super-pixel. The apparatus for processing the depth image may initialize a normal direction of a plane corresponding to the plurality of pixels to a ray direction represented by a spatial point. The plane corresponding to the plurality of pixels may be a plane that passes the spatial point represented by the plurality of pixels.

In operation 720, the apparatus for processing the depth image may connect neighboring pixels by an "edge" to set a pixel pair. The apparatus for processing the depth image may calculate a difference in amplitudes between the neighboring pixels from among pixels configuring an amplitude image.

The apparatus for processing the depth image may not set the neighboring pixels to be the pixel pair, based on a size of the difference in amplitudes between the neighboring pixels. For example, the apparatus for processing the depth image may not set the neighboring pixels to be the pixel pair when the difference in amplitudes between the neighboring pixels is greater than N multiples of an average value. In this instance, the average value may be an average of sums of the difference in amplitudes between the neighboring pixels calculated with respect to the total number of pixels, and N may be a predetermined number.

In operation 730, the apparatus for processing the depth image may align pixel pairs, based on the size of the difference in amplitudes, and determine whether to group the pixels in a sequential manner starting from a pixel pair of which the difference in amplitudes between the pixels is smallest, and in which the difference in amplitudes increases.

In operation 740, the apparatus for processing the depth image may determine whether the neighboring pixels connected by the edge are included in the super-pixel on the same plane. The apparatus for processing the depth image may determine whether to group other neighboring pixels when the neighboring pixels connected by the edge are included in a super-pixel on the same plane.

In operation 750, the apparatus for processing the depth image may determine whether the total number of pixels configuring a different plane is greater than or equal to three when the neighboring pixels are included in the super-pixel on the different plane. When the total number of pixels configuring the super-pixel on the different planes is two, the apparatus for processing the depth image may group the neighboring pixels in operation 770.

In operation 760, the apparatus for processing the depth image may apply a new plane with respect to spatial points of the total number of pixels included in the super-pixel on the different plane when the neighboring pixels are included in the super-pixel on the different plane, and the total number of pixels configuring the super-pixel on the different plane is greater than or equal to three. The plane to be applied to the spatial points may be determined based on a location of the spatial points of the total number of pixels configuring the super-pixel on the different plane.

Subsequently, the apparatus for processing the depth image may determine whether to group neighboring pixels based on a depth offset for the spatial points of the total number of pixels configuring the super-pixel on the different plane. The depth offset for the spatial points may indicate a difference between a depth value on the plane applied to a spatial point and a measured depth value represented by a depth image.

The apparatus for processing the depth image may calculate a depth offset for the spatial points of the pixel configuring the amplitude image using the depth information of the depth image, and generate a super-pixel based on the depth offset calculated and noise estimated.

For example, the apparatus for processing the depth image may generate a super-pixel on a new plane by grouping a total number of pixels configuring a super-pixel on a different plane in operation 770 when a depth offset for a total number of spatial points configuring the super-pixel on the different plane is less than or equal to a predetermined value, such as a K multiple, for example, of noise size a estimated by a noise estimating unit, K being a predetermined number. Conversely, the apparatus for processing the depth image may not perform grouping of a pixel when the depth offset for the spatial points is greater than the predetermined value.

The apparatus for processing the depth image may perform operations 740 through 770 repeatedly, until a determination is made as to whether to group the pixels with respect to the total number of pixel pairs.

An apparatus as used throughout the present specification may include mobile communication devices, such as a personal digital cellular (PDC) phone, a personal communication service (PCS) phone, a personal handy-phone system (PHS) phone, a Code Division Multiple Access (CDMA)-2000 (1x, 3x) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), and an automotive navigation system (for example, a global positioning system), for example. Also, the apparatus as used throughout the present specification may include a digital camera, and a plasma display panel, for example.

The method for processing the depth image according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for processing a depth image, the method comprising:
    estimating noise of a depth image using an amplitude image;
    generating a super-pixel based on amplitude information of a pixel configuring the amplitude image, depth information of the depth image, and the noise estimated; and
    removing the noise of the depth image using the depth information of the depth image and depth information of the super-pixel,
    wherein the generating comprises connecting neighboring pixels by an edge to set a pixel pair, and calculating a difference in amplitudes between the neighboring pixels from among pixels configuring the amplitude image.

2. The method of claim 1, wherein the estimating comprises:
    estimating the noise of the depth image by applying the amplitude information of the pixel configuring the amplitude image to a Gaussian distribution model or a Poisson distribution model.

3. The method of claim 1, wherein the generating comprises:
    calculating a depth offset for a spatial point of the pixel configuring the amplitude image, using the depth information of the depth image, and generating the super-pixel based on the depth offset and the noise estimated.

4. The method of claim 1, wherein the removing comprises:
    determining a depth value of a pixel configuring the depth image based on depth information of the pixel configuring the depth image and an energy function to which the depth information of the super-pixel is applied.

5. The method of claim 4, wherein the energy function is based on a likelihood function with respect to the depth information of the pixel configuring the depth image and a likelihood function with respect to the depth information of the super-pixel.

6. The method of claim 1, wherein the removing comprises:
    determining the depth value of a pixel configuring the depth image based on an energy function with respect to a total number of pixels configuring the depth image.

7. The method of claim 6, wherein the energy function comprises an energy function to which the depth information of at least one of the pixels configuring the depth image and the depth information of the super-pixel are applied and an energy function defined between the neighboring pixels.

8. The method of claim 1, wherein the generating comprises:
    initializing a plurality of pixels from among a total number of pixels to a single planar super-pixel, and
    initializing a normal direction of a plane corresponding to the plurality of pixels to a ray direction represented by a spatial point,
    wherein the plane corresponding to the plurality of pixels comprises a plane that passes the spatial point represented by the plurality of pixels.

9. The method of claim 1, wherein the generating comprises:
    determining whether to set the neighboring pixels to be the pixel pair based on a size of the difference in amplitudes between the neighboring pixels.

10. The method of claim 9, wherein the generating comprises:
    setting the neighboring pixels to be the pixel pair when the difference in amplitudes between the neighboring pixels is less than a number of multiples of an average value,
    wherein the average value comprises an average of sums of the difference in amplitudes between the neighboring pixels calculated with respect to the total number of pixels.

11. The method of claim 1, wherein the generating comprises:
    determining whether to group the neighboring pixels in sequential manner, starting from a pixel of which the difference in amplitudes is smallest, and the difference in amplitudes of the neighboring pixels increases.

12. The method of claim 1, wherein the generating comprises:
    determining whether to group other neighboring pixels when the neighboring pixels connected by the edge are included in a super-pixel on the same plane.

13. The method of claim 1, wherein the generating comprises:
    grouping the neighboring pixels when the neighboring pixels connected by the edge are included in a super-pixel on a different plane, and a total number of pixels configuring the super-pixel on the different plane is two.

14. The method of claim 13, wherein the generating comprises:
    applying a new plane with respect to spatial points for a total number of pixels included in the super-pixel on the different plane when the neighboring pixels are included in the super-pixel on the different plane, and the total number of pixels configuring the super-pixel on the different plane is greater than three,
    wherein the plane to be applied to the spatial points is based on a location of the spatial points of the total number of pixels configuring the super-pixel on the different plane.

15. The method of claim 13, wherein the generating comprises:
    determining whether to group the neighboring pixels based on a depth offset for the spatial points of the total number of pixels configuring the super-pixel on the different plane,
    wherein the depth offset for the spatial points indicates a difference between a depth value on the plane applied to the spatial points and a measured depth value represented by a depth image.

16. An apparatus for processing a depth image, the apparatus comprising:
    a memory having instructions stored thereon; and
    at least one processor configured to execute the instructions such that the processor is configured to,
    estimate noise of a depth image using an amplitude image;
    generate a super-pixel based on amplitude information of a pixel configuring the amplitude image, depth information of the depth image, and the noise estimated; and remove the noise of the depth image using the depth information of the depth image and depth information of the super-pixel, wherein the processor is configured to generate the super-pixel by
  connecting neighboring pixels by an edge to set a pixel pair, and
  calculating a difference in amplitudes between the neighboring pixels from among pixels configuring the amplitude image.

17. A non-transitory computer-readable medium comprising a program, when executed by a computer, configured to cause the computer to:
  estimate noise of a depth image using an amplitude image;
  generate a super-pixel based on amplitude information of a pixel configuring the amplitude image, depth information of the depth image, and the noise estimated; and
  remove the noise of the depth image using the depth information of the depth image and depth information of the super-pixel,
  wherein the generating the super-pixel includes connecting neighboring pixels by an edge to set a pixel pair, and calculating a difference in amplitudes between the neighboring pixels from among pixels configuring the amplitude image.

* * * * *